US009363945B2

(12) United States Patent
Jägenstedt et al.

(10) Patent No.: US 9,363,945 B2
(45) Date of Patent: Jun. 14, 2016

(54) METHOD AND SYSTEM FOR ENHANCING A COVERAGE DISTRIBUTION OF A ROBOTIC GARDEN TOOL

(71) Applicant: Husqvarna AB, Huskvarna (SE)

(72) Inventors: Patrik Jägenstedt, Tenhult (SE); Mattias Kamfors, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/434,197

(22) PCT Filed: Oct. 9, 2012

(86) PCT No.: PCT/SE2012/051078
§ 371 (c)(1),
(2) Date: Apr. 8, 2015

(87) PCT Pub. No.: WO2014/058358
PCT Pub. Date: Apr. 17, 2014

(65) Prior Publication Data
US 2015/0250097 A1    Sep. 10, 2015

(51) Int. Cl.
*A01D 34/00*      (2006.01)
*G05D 1/02*       (2006.01)

(52) U.S. Cl.
CPC ............ *A01D 34/008* (2013.01); *G05D 1/0219* (2013.01); *G05D 2201/0208* (2013.01)

(58) Field of Classification Search
CPC .............. G05D 2201/0203; G05D 2201/0208; G05D 2201/0215; Y10S 901/01
See application file for complete search history.

(56) References Cited

U.S. PATENT DOCUMENTS 4,994,970 A    2/1991  Noji et al.
5,274,988 A *  1/1994  Bruce .................. A01D 34/001
                                              150/157

(Continued)

FOREIGN PATENT DOCUMENTS

GB    2386971 A      10/2003
JP    2001-344017 A  12/2001

(Continued)

OTHER PUBLICATIONS

International Search Report and Written Opinion of PCT/SE2012/051078 mailed Jul. 12, 2013, all enclosed pages cited.

(Continued)

*Primary Examiner* — Thomas G Black
*Assistant Examiner* — Ce Li
(74) *Attorney, Agent, or Firm* — Nelson Mullins Riley & Scarborough LLP

(57) ABSTRACT

A method for enhancing a coverage distribution of a robotic garden tool (100) operating within a predetermined working area (200), wherein the robotic garden tool (100) is provided with steering control means operable to change a movement direction of the robotic garden tool (100), and a positioning device (120). The method comprises the steps of providing (301) working area related data, defining (302) a temporary working area (500), based on the working area related data, which temporary working area (500) at least partly extends within the working area (200), estimating (303) a current position (600) of the robotic garden tool (100), evaluating (304) the estimated current position (600), selectively adapting (305) the temporary working area (500), in response to the step of evaluating (304) the estimated current position, selectively adapting (306) a movement direction of the robotic garden tool (100), in response to the step of evaluating (304) the estimated current position. The steps of selectively adapting (305) the extension of the temporary working area (500) and selectively adapting (306) a movement direction of the robotic garden tool are performed so as to push the robotic garden tool towards the temporary working area or so as to keep the robotic garden tool within the temporary working area (500).

17 Claims, 6 Drawing Sheets

(56) References Cited

U.S. PATENT DOCUMENTS

| | | | |
|---|---|---|---|
| 6,480,768 B1 | 11/2002 | Torii | |
| 7,343,230 B2 * | 3/2008 | McMurtry | A01B 79/005 172/2 |
| 8,839,891 B2 * | 9/2014 | Kaloust | B62D 1/283 180/6.2 |
| 8,938,318 B2 * | 1/2015 | Bergstrom | A01D 34/008 356/614 |
| 8,954,193 B2 * | 2/2015 | Sandin | G05D 1/0255 700/245 |
| 9,043,952 B2 * | 6/2015 | Sandin | G05D 1/0255 |
| 9,043,953 B2 * | 6/2015 | Sandin | G05D 1/0255 |
| 9,072,219 B2 * | 7/2015 | Da Rocha | A01D 34/008 |
| 2004/0073337 A1 * | 4/2004 | McKee | G05D 1/0251 700/245 |
| 2005/0038578 A1 * | 2/2005 | McMurtry | A01B 79/005 701/25 |
| 2011/0238270 A1 | 9/2011 | Beaulieu | |
| 2013/0006419 A1 * | 1/2013 | Bergstrom | A01D 34/008 700/245 |
| 2013/0030609 A1 * | 1/2013 | Jagenstedt | A01D 34/008 701/2 |
| 2013/0066484 A1 * | 3/2013 | Markusson | A01D 34/008 701/2 |

FOREIGN PATENT DOCUMENTS

| | | |
|---|---|---|
| WO | 2011115534 A1 | 9/2011 |
| WO | 2011115535 A1 | 9/2011 |
| WO | 2011115563 A1 | 9/2011 |
| WO | 2011116400 A1 | 9/2011 |
| WO | 2011129728 A1 | 10/2011 |

OTHER PUBLICATIONS

Chapter I International Preliminary Report on Patentability of PCT/SE2012/051078 mailed Apr. 14, 2015, all enclosed pages cited.

* cited by examiner

METHOD AND SYSTEM FOR ENHANCING A COVERAGE DISTRIBUTION OF A ROBOTIC GARDEN TOOL

TECHNICAL FIELD

This invention relates to a method and a system for enhancing a coverage distribution of a robotic garden tool.

BACKGROUND OF THE INVENTION

Robotic garden tools, such as, but not limited to, robotic lawn mowers, are widely used to perform maintenance operations, such as lawn cutting, within predetermined working areas.

At present, boundary wires are often used to delimit the working area, and the robotic garden tool is arranged to move in a randomly generated irregular pattern to ensure complete coverage of the working area. There are also robotic garden tools moving in a partly systematic and partly irregular pattern.

However, when a working area comprises narrow passages interconnecting separated sub-areas of the working area, the robotic garden tool can get stuck in one sub-area for a substantial time. In the case of a robotic lawn mower this may lead to excessive cutting of the sub-area in which the lawnmower gets stuck, and poor coverage of remote sub-areas.

There are several solutions available to minimize the above problem. One common solution is to let the robotic garden tool follow the boundary wire to a remote sub-area every time the mower leaves the charging station. This makes sure that the mower starts in the right place and it is a good way of increasing the ability to handle complex working areas.

WO 20111115563 A1 discloses a system in which a basic map of the working area is generated by means of a simple Global Navigation Satellite System, so as to enhance the boundary following. The system generates the starting position based on calculations of the size of working area and of how many times different points in the working area have been visited A remaining challenge with the above mentioned solutions is that since the movement pattern of the robotic garden tool is random based and/or semi-systematic, the robotic garden tool may leave the remote sub-area almost immediately after arriving to it.

Accordingly, there remains a need for an alternative method and arrangement for enhancing a coverage distribution of a robotic garden tool.

SUMMARY OF THE INVENTION

In view of the above, it is an objective of the present invention to provide an alternative method and arrangement for enhancing a coverage distribution of a robotic garden tool.

The objective is at least partly achieved according to method for enhancing a coverage distribution of a robotic garden tool operating within a predetermined working area, according to claim 1. The robotic garden tool is provided with steering control means operable to change a movement direction of the robotic garden tool, and a positioning device. The method comprises the steps of providing working area related data, defining a temporary working area, based on the working area related data, which temporary working area at least partly extends within the working area, estimating a current position of the robotic garden tool by means of the positioning device, evaluating the estimated current position with respect to the temporary working area, selectively adapting the temporary working area, in response to the step of evaluating the estimated current position, selectively adapting a movement direction of the robotic garden tool, in response to the step of evaluating the estimated current position. The steps of selectively adapting the extension of the temporary working area and selectively adapting a movement direction of the robotic garden tool are performed so as to push the robotic garden tool towards the temporary working area and/or so as to keep the robotic garden tool within the temporary working area.

In this way an enhanced coverage distribution of the robotic garden tool may be provided, since the method provides a simple way of both leading the robotic garden tool towards a selectable temporary working area and keeping it inside the temporary working area.

According to an embodiment, the robotic garden tool is adapted to move in an irregular pattern within the working area.

According to an embodiment the positioning device comprises a positioning system, such as for example a GNSS receiver or a local radio beacon. Thereby, the method may be implemented in a cost efficient way.

According to an embodiment, the step of providing working area related data comprises providing geographical data and statistical data regarding a plurality of zones into which the working area is divided.

According to an embodiment the statistical data comprises information regarding a number of times that a zone has been visited by the robotic garden tool.

According to an embodiment, the statistical data comprises information about a grade of effort needed to perform a maintenance operation within different zones.

According to an embodiment, in the step of estimating a current position of the robotic garden tool, an odometer is used to supplement the positioning device. Thereby, the accuracy may be enhanced.

According to an embodiment the step of selectively adapting the temporary working area comprises enlarging the temporary working area if the estimated current position is outside the temporary working area.

According to an embodiment the step of evaluating involves comparing the current estimated position with a preceding estimated position. In this way a "border crossing" may be recognized. A border crossing means that the robotic garden tool has either crossed a border of the temporary working area from the outside of the temporary working area to the inside of the temporary working area since its position was estimated the preceding time, or that the robotic garden tool has left the temporary working area since its position was estimated the last time.

According to an embodiment, the step of selectively adapting the temporary working area comprises decreasing an extension of the temporary working area provided that the estimated current position is within the temporary working area and provided that one or several predetermined conditions are fulfilled. Thereby, a simple method for leading the robotic garden tool towards a requested area is achieved.

According to an embodiment the steps of estimating a current position, evaluating the estimated current position, selectively adapting the extension of the temporary working area, and selectively adapting a movement direction of the robotic garden tool, are repeated until a predetermined stop condition is fulfilled.

According to a second aspect of the invention solution system for enhancing a coverage distribution of a robotic garden tool operating within a predetermined working area, is provided. The system comprises steering control means operable to change a movement direction of the robotic garden tool, a positioning device operable to estimate a current position of the robotic garden tool, data providing means for providing data related to the working area, temporary working area defining means, operable to define a temporary working area, based on the working area related data, evaluating means operable to evaluate an estimated current position with respect to the temporary working area, control means for selectively adapting the temporary working area and for selectively adapting a movement direction of the robotic garden tool, in response to data generated from the evaluating means.

The advantages of the system of the present invention are similar to the method according to the present invention.

DEFINITIONS

As used herein the following terms have the following meanings:

A "coverage distribution" of a robotic garden tool denotes how the robotic garden tool covers different portions of the working area while moving within the working area. If the robotic garden tool passes certain portions of the working area a lot of times, while leaving other portions untreated, an optimal coverage distribution is probably not achieved, but may be amended.

"Selectively" performing an operation denotes performing the operation under certain predetermined conditions, and not performing the operation if the conditions are not fulfilled.

"Selectively" performing two operations means that both, one of or none of the operations may be performed, depending on the conditions to be fulfilled.

A "semi-systematic" movement pattern comprises systematic movements (such as moving in straight lines) as well as irregular movements (such as a randomly generated movement).

BRIEF DESCRIPTION OF THE DRAWINGS

The invention will be understood and appreciated more fully from the following detailed description, taken in conjunction with the drawings, in which.

It is to be understood that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DESCRIPTION OF PREFERRED EMBODIMENTS

Figure 1:
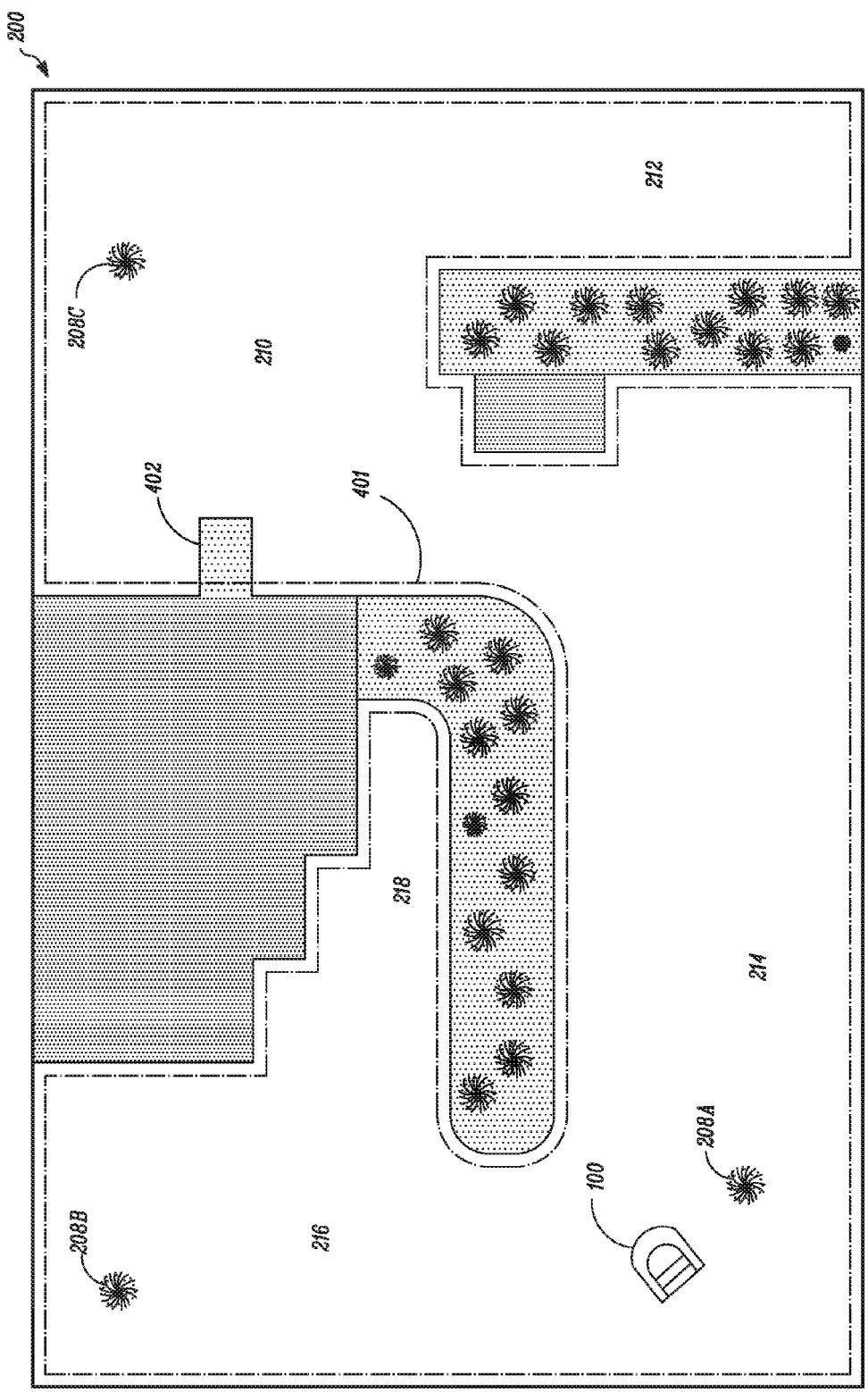
FIG. 1 is a schematic view of an exemplary working area, in which a robotic garden tool is arranged to operate.

FIG. 1 schematically illustrates a working area 200 for a robotic garden tool 100, according to an embodiment of the present invention.

In the embodiment disclosed hereinafter, the robotic garden tool is adapted to move in an irregular pattern within the working area. It is to be understood however the method and system of the present invention would also be applicable to a robotic garden tool having a semi-systematic movement pattern. Such a robotic garden tool could for example move systematically part of the time that it is operating, and in an irregular pattern part of the time.

The robotic garden tool 100 is configured to perform a tending operation within the limited working area 200, while moving in an irregular pattern within the working area. The working area 200 may comprise any terrain with vegetation, such as lawns, gardens, yards, golf courses, fields, and the like. There may be one or more boundaries defining the working area 200.

A signal source 401 may be provided to delimit the boundary of the working area 200. In an embodiment of the present invention, the signal source 401 is a boundary wire 401 extending along the perimeter of the working area 200. The boundary wire 401 may be buried into the ground. Further, the signal source 401 may produce one or more signals for the robotic garden tool 100. The one or more signals may have particular characteristics associated with it, such as, but not limited to frequency, phase and strength.

The boundaries of the working area 200 may also be defined by fixed objects 208a, 208b, and 208c as shown in FIG. 1, fences (not shown) and the like.

Further, a sensor unit may be mounted in the robotic garden tool 100 for detecting one or more signals from the signal source 401 and thus identifying the boundaries of the working area 200. A charging station 402 to which the robotic garden tool may be docked during a battery charging operation may be provided within, or adjacent to, the working area.

As shown in FIG. 1, a working area may have an irregular shape, with a plurality of sub-areas 210-218. The sub-areas may be separated by narrow passages. When a working area comprises such narrow passages interconnecting separated sub-areas of the working area, a robotic garden tool moving in a randomly based pattern can get stuck in one sub-area for a substantial time. In the case of a robotic lawn mower this may lead leads to excessive cutting of the sub-area in which the lawn-mower gets stuck, and poor coverage of remote sub-areas.

Figure 2:
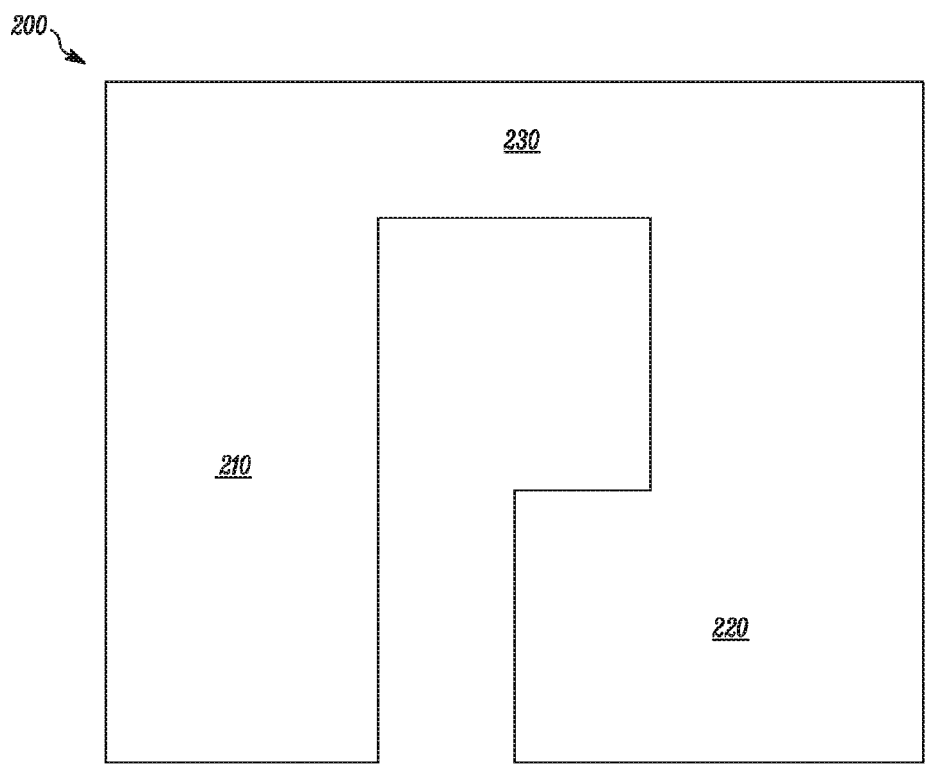
FIG. 2 is a schematic view of another exemplary working area.

A second example of a working area is shown in FIG. 2. The working area 200 comprises two sub-areas 210, 220 which area separated by a narrow passage.

As previously mentioned, there are several solutions available to minimize the above problem. One common solution is to let the robotic garden tool follow the boundary wire or a separate guiding wire to a remote sub-area every time the mower leaves the charging station, or a part of the times that the mower leaves the charging station. This makes sure that the mower starts in the right place and it is a good way of increasing the ability to handle complex working areas.

WO 20111115563 A1 discloses a system in which a basic map of the working area is generated by means of a simple Global Navigation Satellite System, so as to enhance the boundary following. The system generates the starting position based on calculations of the size of working area and of how many times different points in the working area have been visited.

According to the present invention, it is possible not only to lead the robotic garden tool to a certain part of the working area, but also to keep it in that part as long as needed.

According to the present invention, the robotic garden tool is provided with a positioning device. The positioning device may be a GNSS receiver. According to an embodiment, the positioning device is a standard GPS receiver.

An essential feature of the present invention is to select a target portion or target point within the working area, towards which point of portion the robotic garden tool should be lead.

In order to make a proper selection of target point, certain information about the working area must be provided. In the following such information is referred to as working area related data.

The working area related data may comprise geographical information about the working area as well as other relevant information about the working area.

Geographical information may be provided as a basic map of the working area.

Figure 3:
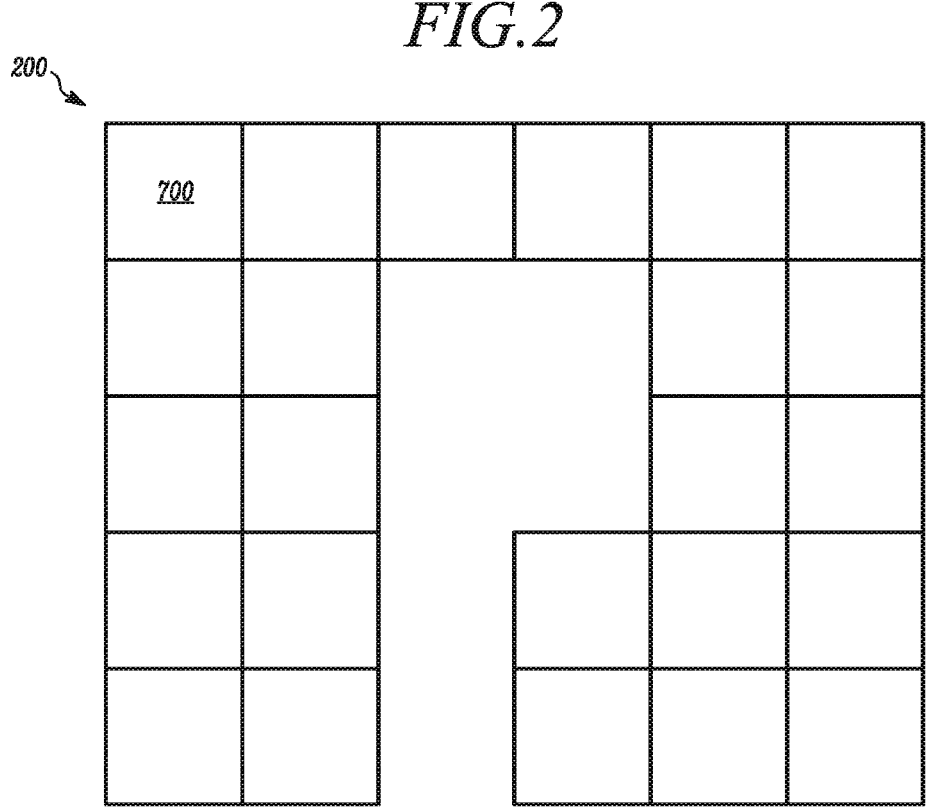
FIG. 3 is a schematic view of a basic map of the working area of FIG. 2.

A control unit provided in the robotic garden tool 100 may be adapted to generate such a basic map of the working area 200 based on position coordinates received from the positioning device (and the one or more converted electric signals received from a sensor unit). Position coordinates may be received from the positioning device while the robotic garden tool 100 moves around the working area 200 in an irregular pattern. FIG. 3 illustrates an exemplary basic map of a working area 200. The basic map may comprise a grid of zones 700.

The working area related data may also comprise other kinds of data. An example is statistical data regarding the received position coordinates. The statistical data may concern how many times a certain position has been visited by the robotic garden tool.

Another example of working area related data could be information about the effort needed to cut grass in various areas of the working area, e.g. depending on the length of the grass within an area or the quality of the grass within that area.

When working area related data has been provided it is possible to select an appropriate target point 505 or target area, based on the working area related data.

According to an exemplary embodiment, a target point 505 is positioned in an area of the working area 200 in which area the robotic garden tool has been only a few number of times as compared to other areas of the working area.

A target point 505 or target area could also be selected based on other information. As an example it could be possible to select an area in which it has been recognized that a lot of effort was needed to cut the grass.

The target point 505 may be used when defining a temporary working area 500. The temporary working area 500 is a virtual area in which it is requested that the robotic garden tool operates for a certain time, or until one or several predetermined conditions are fulfilled.

According to an embodiment a virtual border is defined around the target point, such that a temporary working area 500 is defined.

The temporary working area 500 may have any shape. According to an exemplary embodiment, the virtual border extends at a predetermined distance from the target point, so as to create a circular temporary working area.

Figure 4:
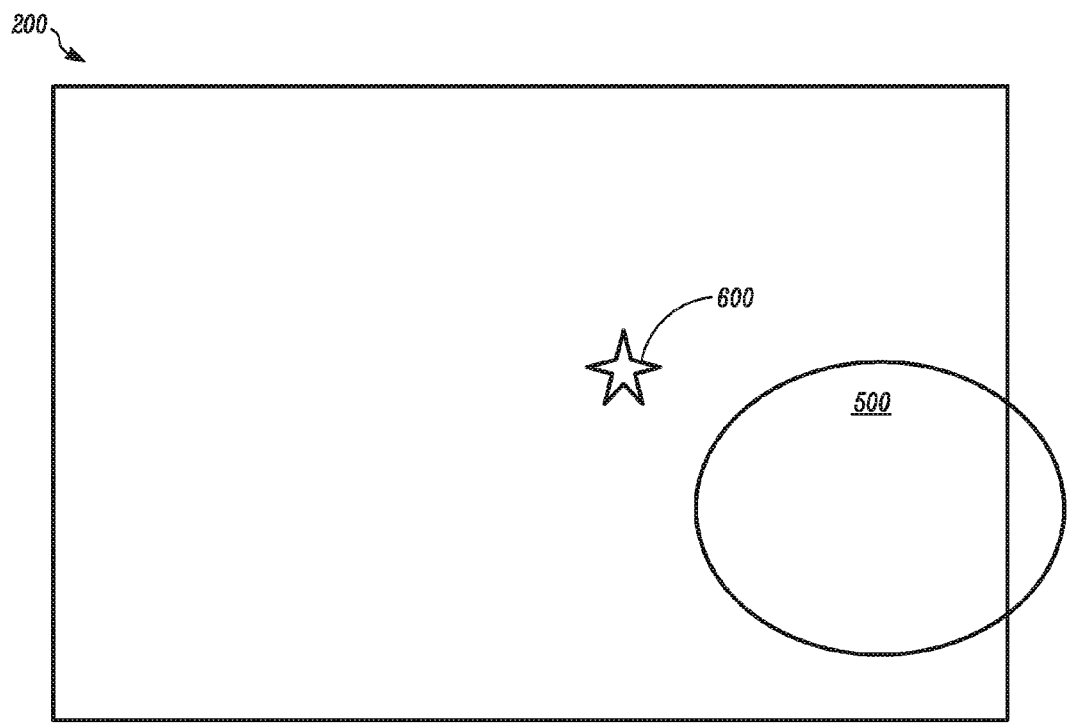
FIG. 4 is a schematic view of an exemplary working area, with a temporary working area and an estimated position of the robotic garden tool.

FIG. 4 illustrates an exemplary temporary working area 500.

The positioning device is used to estimate a current position 600 of the robotic garden tool. The estimated current position is then evaluated with respect to the temporary working area 500.

FIG. 4 illustrates a situation in which the estimated current position is not within the temporary working area.

Figure 5:
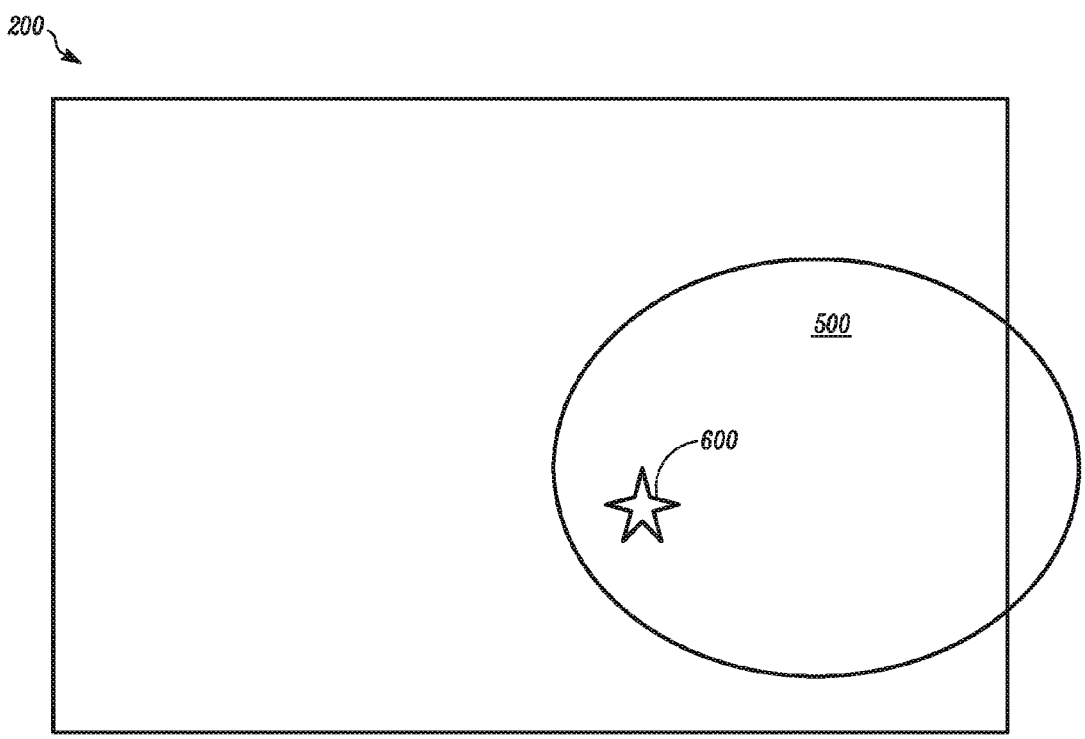
FIG. 5 is a schematic view according to FIG. 5, in which the temporary working area and the estimated current position of the robotic garden tool are different from the ones of FIG. 4.

FIG. 5 illustrates a situation in which the estimated current position is within the temporary working area.

The essence of the present invention is the ability to adapt the temporary working area 500 as well as the movement direction of the robotic garden tool such that a "rubber band effect" is achieved when leading the robotic garden tool towards the target point 505.

According to an embodiment the temporary working area is adapted by means of increasing its radius when the estimated current position is not within the target working area.

A turning event may be generated so as to adjust a movement direction of the robotic garden tool, when it is recognized that its current estimated position is not within the target working area.

In the following different steps of a method according to an embodiment of the invention will be described.

Figure 6:
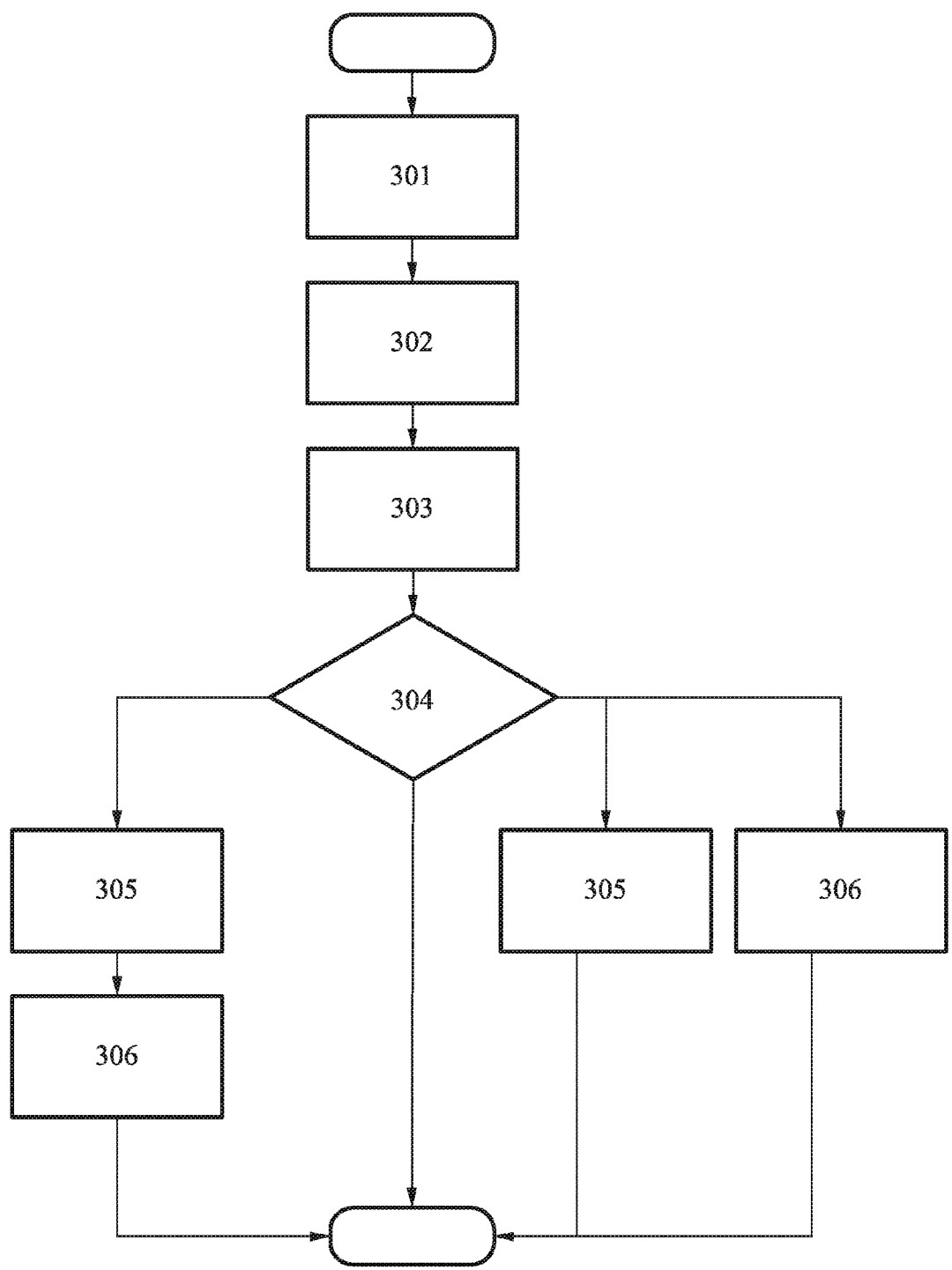
FIG. 6 is a flowchart illustrating a method according to an embodiment of the invention.

FIG. 6 is a flow chart illustrating different method steps.

The first step 301 comprises providing working area related data. This may be done as previously described.

Figure 7A:
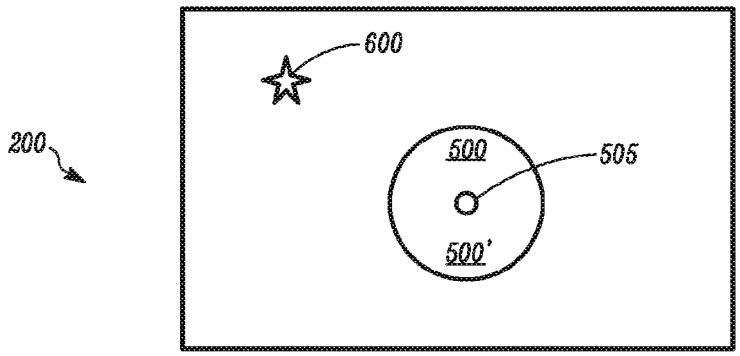
FIGS. 7a-7g are schematic views illustrating different steps performed in a method according to the present invention.

When working area related data is provided, the next step 302 is to select a target point 505 and a temporary working area 500 comprising that target point 505. In FIGS. 7a-7g such initial temporary working area, defined based on working area related data, is denoted 500'. FIG. 7a illustrates a state in which a temporary working 500 area has just been defined. Since it has not yet been adapted, it is equal to the initial temporary working area 500'.

In order to estimate 303 a current position 600 of the robotic garden tool, a positioning device is used. The positioning device may be a standard GNSS receiver provided on the robotic garden tool.

In the case shown in FIG. 7a, the step of evaluating 304 the estimated current position will indicate that the robotic garden tool is outside of the temporary working area 500.

The next step is to adapt 305 the temporary working area if needed and to 306 adapt a movement direction of the robotic garden tool if needed.

These adaptations are made selectively which means that they are made only if certain predetermined conditions are fulfilled, and also that the adaptations are chosen depending on certain conditions. One, neither of or both of the steps 305 and 306 may be performed, as shown in FIG. 6.

According to an embodiment, the temporary working area is enlarged if the estimated current position is not within the temporary working area.

According to an embodiment, the movement direction of the robotic garden tool is adapted if the estimated current position is not within the temporary working area.

When a state as illustrated in FIG. 7a has been identified, the measure to be taken may be to adapt 305 the temporary working area as well as adapting 306 the movement direction of the robotic garden tool.

Figure 7B:
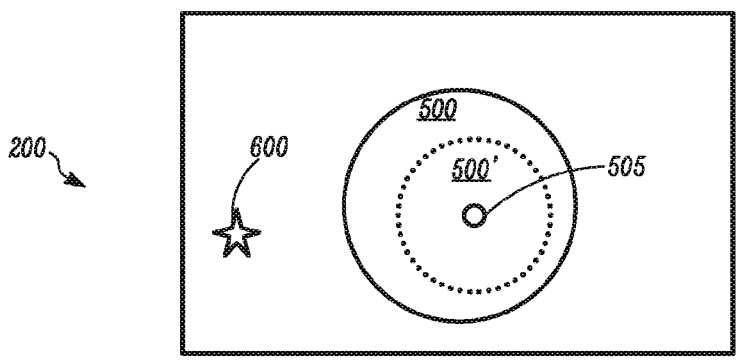

The step of adapting the temporary working area may be to increase a radius of the temporary working area, such that it is enlarged. Such an adapted temporary working area 500 is shown in FIG. 7b. In FIG. 7b, the initial temporary working area 500' is also shown. The new temporary working area overlaps the initial temporary working area 500' and comprises the target point 505.

The step of adapting the movement direction of the robotic garden tool may comprise generating a turning event, such that the robotic garden tool will stop moving in the direction it is currently moving in, and starting moving in another direction. The new direction may be randomly chosen.

Now that the temporary working area 500 as well as the movement direction of the robotic garden tool is adapted, a new current position 600 of the robotic garden tool may be estimated and evaluated.

FIG. 7b illustrated a state in which the robotic garden tool has a new estimated current position 600 as compared to the one of FIG. 7a. This estimated current position will now be evaluated with respect to the temporary working area 500 shown in FIG. 7b.

In the case illustrated in FIG. 7b, the robotic garden tool is still not within the temporary working area, and consequently, the temporary working area as well of the movement direction of the robotic garden tool may preferably be adapted.

Figure 7C:
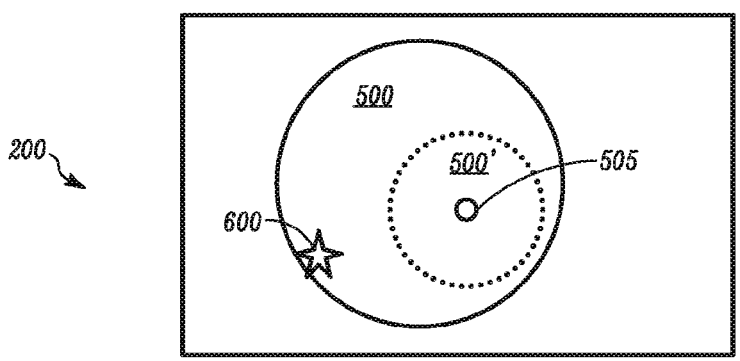

The temporary working area may be further stretched, as illustrated in FIG. 7c.

The steps of estimating a current position, evaluating it, and selectively adapting the temporary working area as well as the movement direction, may be repeated at a predetermined time interval. They may e.g. be repeated every second as the robotic garden tool travels within the working area.

When the estimated current position of FIG. 7c is evaluated, the robotic garden tool is found to be within the temporary working area 500.

However, the borders of the temporary working area have now been stretched like a rubber band, as compared to the initial temporary working area 500'. The estimated current position is far away from the target point 505.

After evaluation 30 of the situation shown in FIG. 7c, the measures to be taken may be chosen depending one or several conditions.

In order to push the robotic garden tool towards the initial temporary working area 500' and the target point 505, the current temporary working area 500 may now be shrunk.

The decision to shrink the temporary working area may be based on an evaluation of the estimated current position of the robotic garden tool compared to a previously estimated current position.

If the estimated current position as well as the consecutively preceding estimated current position are both within the temporary working area, it is recognized that the borders of the temporary working area have not been crossed since the last estimation. This indicates that the robotic garden tool has been within the temporary working area for a while, and the decision may be to reduce the temporary working area such that it starts regaining the shape of the initial temporary working area.

Figure 7D:
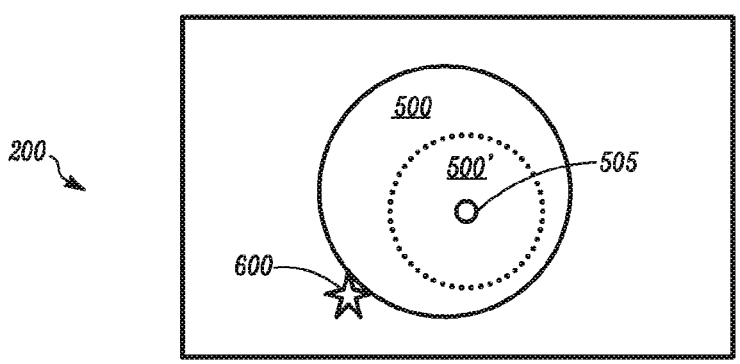

FIG. 7d illustrates a state in which the temporary working area has been reduced. The estimated current position evaluated in respect to this temporary working area will be found to be outside of the temporary working area, and the actions to be taken may be to change a movement direction of the robotic garden tool. The temporary working area may also be enlarged again.

In the way described above, the robotic garden tool is pushed towards the target point and the initial temporary working area.

Figure 7E:
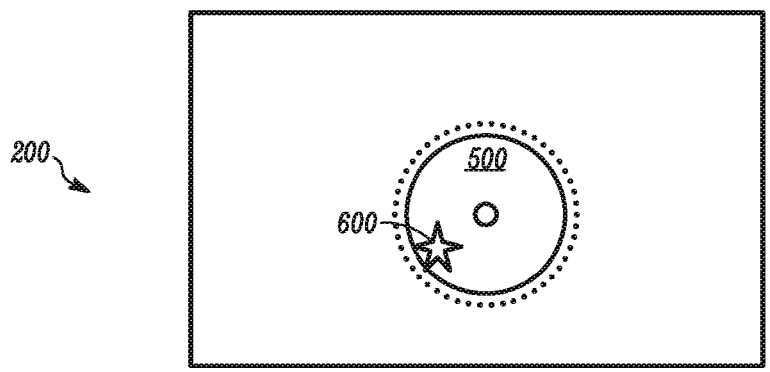

The temporary working area may be adapted until it is equal to the initial temporary working area. As shown in FIG. 7e, the temporary working area may even be smaller than the initial temporary working area. There may be a stop condition determining a minimum size or radius of the temporary working area.

By means of continuing selectively adjusting the movement direction of the robotic garden tool as well as the borders of the temporary working area once the robotic garden tool is "captured" within the temporary working area, the robotic garden tool will not "escape" from the temporary working area directly, but is kept within the temporary working area.

In the case of a robotic lawn mower, it is thus secured that the grass of the temporary working area is properly cut.

The robotic garden tool may be kept within the temporary working area until one or several predetermined stop condition is fulfilled. One possible stop condition may be that the robotic garden tool has been operating within a selected area for a certain time.

Figure 7F:
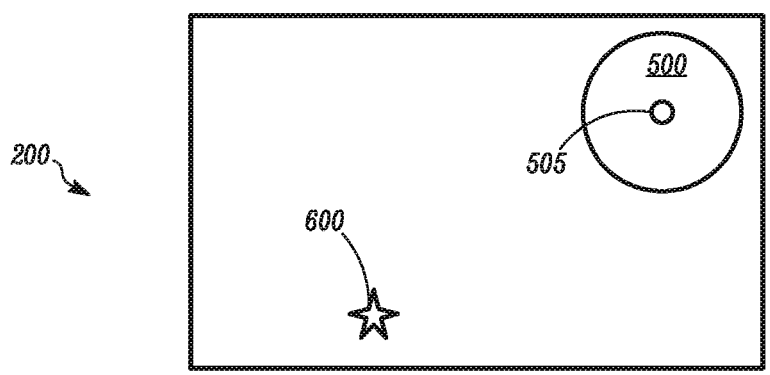
Figure 7G:
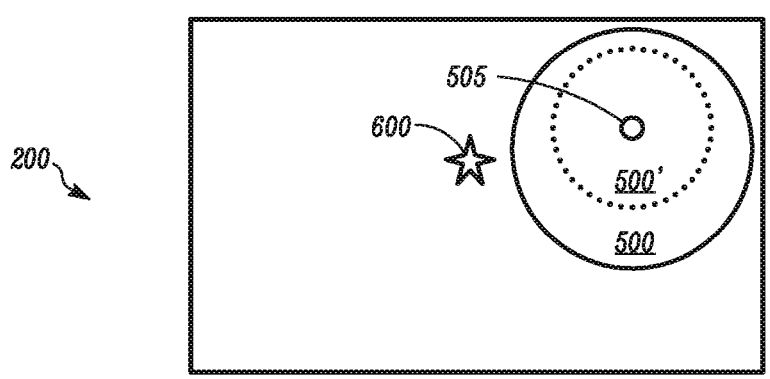

As a next step, a new target point 505 and a new temporary working area 500, 500' may be selected, based on working area related data. This is illustrated in FIGS. 7f and 7g.

In this way the coverage distribution of the robotic garden tool within the working area is enhanced, since areas where operation of the robotic garden tool is needed most are covered.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

The invention claimed is:

1. A method for enhancing a coverage distribution of a robotic garden tool operating within a predetermined working area,
    wherein the robotic garden tool is provided with steering control means, operable to change a movement direction of the robotic garden tool, and a positioning device,
    the method comprising:
    providing working area related data,
    defining a temporary working area, based on the working area related data, the temporary working area at least partly extending within the working area,
    estimating a current position of the robotic garden tool via the positioning device,
    evaluating the estimated current position with respect to the temporary working area,
    selectively adapting the temporary working area, in response to evaluating the estimated current position,
    selectively adapting a movement direction of the robotic garden tool, in response to evaluating the estimated current position,
    wherein selectively adapting the extension of the temporary working area and selectively adapting a movement direction of the robotic garden tool are performed so as to push the robotic garden tool towards the temporary working area or so as to keep the robotic garden tool within the temporary working area.

2. The method according to claim 1, wherein the robotic garden tool is adapted to move in an irregular pattern within the working area.

3. The method according to claim 1, wherein the positioning device comprises a GNSS receiver.

4. The method according to claim 1, wherein providing working area related data comprises providing coordinate data and statistical data regarding a plurality of zones into which the working area is divided.

5. The method according to claim 4, wherein the statistical data comprises information regarding a number of times that a zone has been visited by the robotic garden tool.

6. The method according to claim 4, wherein the statistical data comprises information about a grade of effort needed to perform a maintenance operation within different zones.

7. The method according to claim 1, wherein, in estimating a current position of the robotic garden tool, an odometer is used to supplement the positioning device.

8. The method according to claim 1, wherein selectively adapting the temporary working area comprises enlarging the temporary working area if the estimated current position is outside the temporary working area.

9. The method according to claim 1, wherein evaluating involves comparing the current estimated position with a preceding estimated position.

10. The method according to claim 9, wherein selectively adapting the temporary working area comprises decreasing an extension of the temporary working area provided that the estimated current position is within the temporary working area and provided that one or several predetermined conditions are fulfilled.

11. The method according to claim 10, wherein a predetermined condition is that a predetermined minimum size of the temporary working area is not reached.

12. The method according to claim 10, wherein a predetermined condition is that a predetermined time has passed since a border crossing was recognized.

13. The method according to claim 1, wherein the steps of
estimating a current position,
evaluating the estimated current position,
selectively adapting the extension of the temporary working area, and selectively adapting a movement direction of the robotic garden tool, are repeated until a predetermined stop condition is fulfilled.

14. A system for enhancing a coverage distribution of a robotic garden tool operating within a predetermined working area,
the system comprising a control unit of the robotic garden tool and a positioning device operable to estimate a current position of the robotic garden tool, the robotic garden tool being configured to perform a method comprising:
providing working area related data,
defining a temporary working area, based on the working area related data, the temporary working area at least partly extending within the working area,
estimating a current position of the robotic garden tool via a positioning device,
evaluating the estimated current position with respect to the temporary working area,
selectively adapting the temporary working area, in response to evaluating the estimated current position,
selectively adapting a movement direction of the robotic garden tool, in response to evaluating the estimated current position,
wherein selectively adapting the extension of the temporary working area and selectively adapting a movement direction of the robotic garden tool are performed so as to push the robotic garden tool towards the temporary working area or so as to keep the robotic garden tool within the temporary working area.

15. The system according to claim 14, wherein the robotic garden tool is adapted to move in an irregular pattern within the working area.

16. The system according to claim 14, wherein the positioning device comprises a low accuracy GNSS receiver.

17. The system according to claim 14, wherein the working area related data comprises coordinate data and statistical data regarding a plurality of subareas into which the working area is divided.

* * * * *